Jan. 17, 1939.  S. INGILDSEN  2,144,112
LAND VEHICLE
Filed April 18, 1936  3 Sheets-Sheet 1

INVENTOR.
Sven Ingildsen.
BY
Dike, Calvert & Gray
ATTORNEYS.

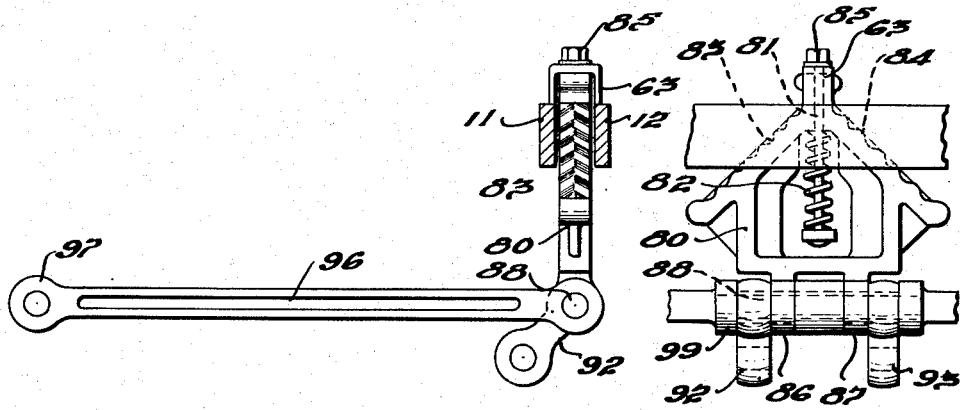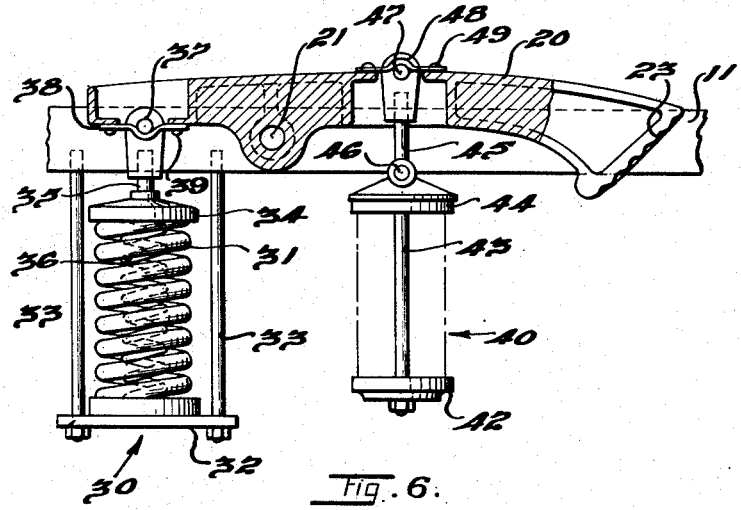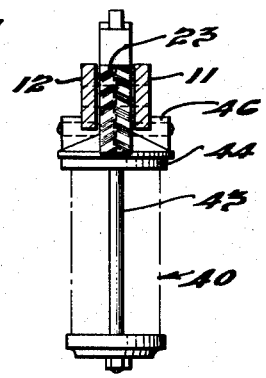

Jan. 17, 1939. S. INGILDSEN 2,144,112
LAND VEHICLE
Filed April 18, 1936   3 Sheets-Sheet 3

INVENTOR.
Sven Ingildsen.
BY
ATTORNEYS.

Patented Jan. 17, 1939

2,144,112

UNITED STATES PATENT OFFICE 2,144,112

LAND VEHICLE

Sven Ingildsen, Detroit, Mich., assignor of one-half to O. L. Smith, Detroit, Mich.

Application April 18, 1936, Serial No. 75,060

15 Claims. (Cl. 280—124)

This invention relates to land vehicles and more particularly to spring suspensions therefor.

One of the objects of the present invention is to provide a novel spring suspension for land vehicles in which the rate of spring deflection is increased with the decrease of the load of the vehicle, whereby a more comfortable and economical operation of the vehicle is assured.

A further object of the invention is to provide a land vehicle in which the deflection of the springs on both sides is substantially equalized in operation, whereby the springs of the vehicle are uniformly deflected and resist the tendency of uneven deflection with an increased resisting force and consequently assist in preventing overturning of the vehicle.

A still further object of the invention is to provide a novel vehicle which can be operated on the curved portions of highways at much higher speeds than it is possible to operate vehicles with conventional spring suspension designs, as the spring suspension is of such a character that should the vehicle be tilted toward the inside of the curve around which it travels, a sudden increase of the centrifugal force will not cause the inertia of the suddenly applied load to deflect dangerously the relieved outer springs of the vehicle.

A still further object of the invention is to provide a land vehicle, the spring suspension of which is such that when the body of the vehicle assumes an extreme inclined position, the springs at its elevated side are lowered by further tilting of the body, thereby reducing the danger of completely overturning the vehicle.

It is a further object of the invention to provide a vehicle spring mechanism, particularly but not exclusively adapted for heavy duty vehicles, which will respond readily to differing load conditions imposed thereon and which is rigid in construction, economical in design, readily installed and serviced, and which possesses a long life in use.

It is a further object of the invention to provide a vehicle spring mechanism which permits a controlled substantially independent springing of the vehicle wheels to accommodate variations in the road surface.

A vehicle spring as herein shown and described as applied to a motor vehicle truck, has definite advantages which adapt it for use on many types of other land vehicles, such for example as street and railroad cars, Diesel propelled railway units, automobile passenger cars, and the like, and all such uses are within the contemplated scope of the invention.

Other objects and advantages of this invention will appear in the following description and appended claims, reference being had to the accompanying drawings forming a part of this specification, wherein one embodiment of the present invention is illustrated.

In the drawings, wherein like reference characters designate corresponding parts in the several views, Fig. 1 is a side elevation, with parts broken away, of a spring suspension structure embodying the present invention attached at the side of a vehicle frame.

Fig. 4 is a view similar to that of Fig. 3 showing the torque arm and the shackle assembly separately.

Fig. 5 is a side view of the structure shown in Fig. 4, the extending parts of the torque arm and of the sub-frame members being broken away.

Fig. 6 is a side view of one rocker arm assembly, partly in section, showing the method of spring attachment.

Fig. 7 is a rear view of one rocker arm assembly.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation, and it is not intended to limit the invention claimed herein beyond the requirements of the prior art.

Figure 1:
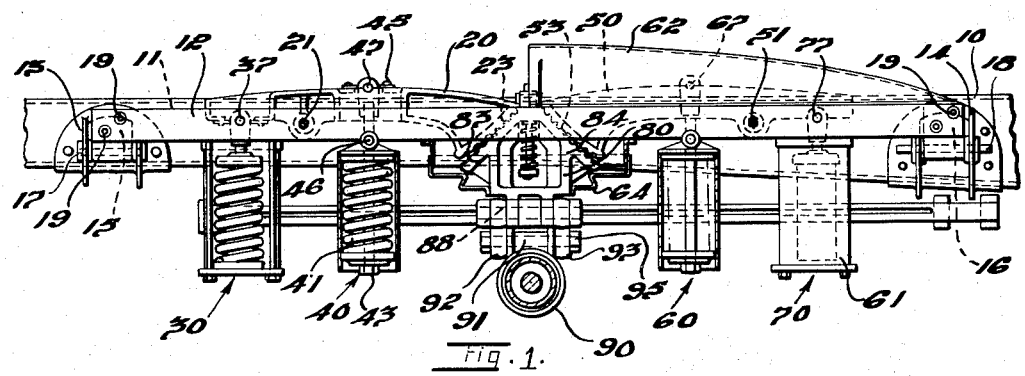
Figure 2:
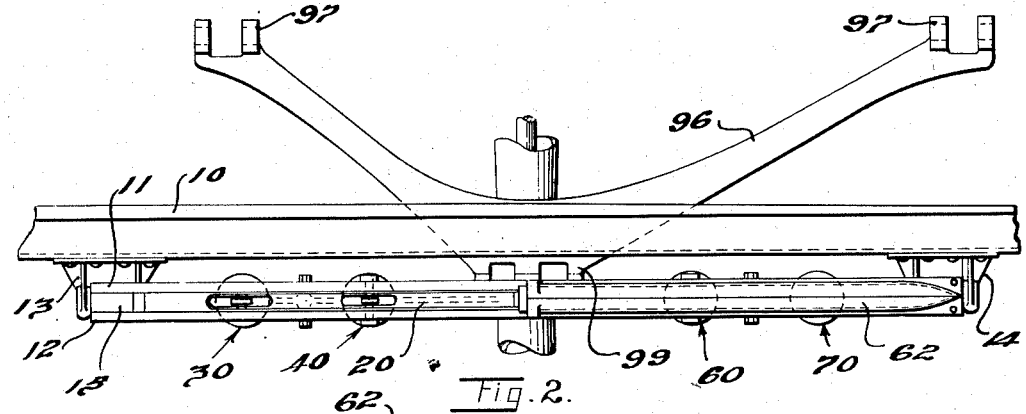
Fig. 2 is a top view of the structure shown in Fig. 1.
Figure 3:
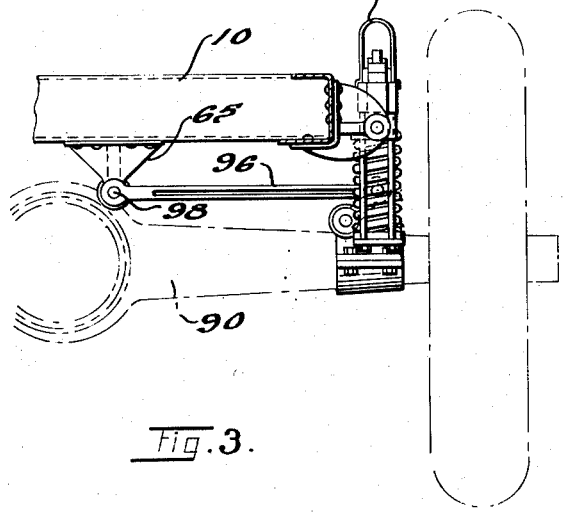
Fig. 3 is a rear view of the structure of Fig. 1 illustrating the relation thereof to other parts of the vehicle structure.

Fig. 1 shows one spring suspension unit attached to the vehicle frame. Any desired number of such units may be used on the vehicle with slight changes in construction. In a conventional installation, two of the units are used to replace the conventional type of rear springs, one unit being mounted on each side of the vehicle frame.

Each spring suspension unit, as shown in Fig.

1, is located at the side of a vehicle A and comprises two parallel sub-frame members 11 and 12, hingedly connected with the aid of brackets 13 and 14 to the vehicle frame 10. Blocks 15 and 16, provided between the members 11 and 12 at the extremities thereof, insure the desired spacing between said members 11 and 12 and furnish bearings for hinge pins 17 and 18 secured in the brackets 13 and 14, respectively. The members 11 and 12 are connected at their respective extremities with said blocks 15 and 16 by means of a plurality of bolts 19. The above-described construction permits the sub-frame assembly to turn around the common axis of the hinge pins 17 and 18 to provide for movements of the vehicle axle, as will appear more fully from further consideration of the description.

Rocker arms 20 and 50 are housed between said members 11 and 12 and are hingedly connected to said members 11 and 12 as shown at 21 and 51. The rocker arms 20 and 50, and the mechanisms attached thereto and cooperating therewith, are similar on both sides of a vertical central plane which passes through the axis of the vehicle axle. The rocker arms 20 and 50 at their inner extremities, that is, at the extremities adjacent said vertical plane, are provided with gear portions 23 and 53, respectively, said portions cooperating with rack portions 83 and 84 of a wedge-shaped member 80. The gear teeth as here shown are of a herringbone design which remain in constant mesh and act practically without noise in operation. The teeth are cut according to the British Association standard to achieve these results and are found to be very long wearing in use. Any desired type of gear cutting may be used, however, which will provide for constant meshing of the gears and elimination of noise in operation. Said wedge-shaped member 80 is hingedly affixed, with the aid of shackles 92 and 93, and pins 95 and 88, to the axle 90 of the vehicle. The pin 95 is secured in a boss 91 affixed in any suitable manner or integrally formed at the housing of the axle 90, and it is journaled at its ends in the shackles 92 and 93, the opposite ends of which carry the pin 88.

Spring assemblies 30 and 40 are provided on both sides of the hinge 21. The spring assembly 30 comprises a helical spring 31 (Fig. 6), the lower end of which rests on a plate 32 rigidly suspended from the members 11 and 12 with the aid of a plurality of bolts 33. The upper end of said spring 31 bears against a cup 34 provided with a vertical stud 35 having a suitable head and carrying a pin 37 therein, which pin bears against the plate 38 affixed to the rocker arm 20 by means of a plurality of screws 39. An overload helical spring 36 is arranged inside of the spring 31 as shown. In certain uses of the invention such overload springs may be dispensed with, as, for example, where the normal load conditions of the vehicle are such as are accommodated by the springs 31 without violent action thereof.

A spring assembly 40 comprises a helical spring 41, the lower end of which rests at a plate 42, while its upper end bears against the cup 44. The cup 44 is connected to the members 11 and 12, as shown at 46 (Fig. 7). A stud 45 is hingedly connected to the rocker arm 20 with the aid of a pin 47 which bears against a plate 48 affixed to the rocker arm 20 by a plurality of screws 49 and is hingedly connected at its lower end to a bolt 43 passing through a hole in said cup 44 and connected to the plate 42.

Spring assemblies 60 and 70 are provided to cooperate with the rocker arm 50, and in their construction and operation they are identical to the spring assemblies 30 and 40, respectively, just previously described in detail.

Spring assemblies 30, 40, 60 and 70 are provided with suitable covers such as shown at 61. Members 11 and 12 are also provided with top covers, such as shown at 62.

The wedge-shaped member 80 is provided with means insuring constant engagement of its rack portions 83 and 84 with gear portions 23 and 53 of the rocker arms 20 and 50, said means comprising a bolt 81 (Fig. 5) arranged at a centrally located vertical hole drilled in the wedge body. A suitable helical spring 82, provided at the lower portion of the bolt 81, bears against the head of the bolt 81 in the upper portion of the recess in the wedge body. A supporting clamp 63 rests by its lugs on the members 11 and 12 and is retained in place by the bolt 81 passing through it. A suitable nut 85 is provided at the top of the bolt 81 for the purpose of retaining said bolt in place. Since the spring 82 is constantly compressed and members 11 and 12 resist the downward movement of the bolt 81, the upper part of the spring 82 exerts sufficient pressure upon the wedge-shaped member 80 to hold its rack portions in constant mesh with the gear portions 23 and 53 of the arms 20 and 50. At its lower end, the wedge-shaped member 80 is provided with lugs 86 and 87, which lugs provide bearings for the pin 88. A flexible cover 64 (Fig. 1) is arranged around the lower part of the wedge-shaped member 80 to cover the meshing gear and rack portions from dust and dirt.

A torque arm 96 is arranged for connecting the axle 90 to the vehicle frame 10 and includes a curved member having a plurality of pin-receiving lugs, such as shown at 97. Two brackets, such as shown at 65 and 101 (Fig. 8), are fixed to the frame 10 of the vehicle and carry pins such as shown at 98 and 102. The torque arm 96 is situated substantially in a horizontal plane and the middle part of its curved portion has a plurality of pin-engaging lugs, such as shown at 99, which engage the pin 88.

The foregoing construction is such that the weight of the load carried by the vehicle A is transmitted through the body thereof and to the frame 10 supporting said body. From the frame 10 the weight is further transmitted to the brackets 13 and 14, and by them to pins 17 and 18 which press downward on the blocks 15 and 16. Through the bolts 19, the pressing effort of said pins is transmitted to the extremities of the sub-frame members 11 and 12, which members act through the pins 21 and 51 to exert downwardly directed forces upon the rocker arms 20 and 50. From the rocker arms 20 and 50, said weight is transmitted to the wedge-shaped member 80 and through the pin 88 engaging said member 80 at its lugs 86 and 87, to the shackles 92 and 93. Such shackles transmit the weight of the load and sprung weight of the vehicle to the pin 95 and to the housing of the axle 90, and thence through the respective wheels of the vehicle to the ground.

In operation, the axle 90, together with the wheels, goes through a regular cycle of movements. The axle may move bodily up and down if the spring deflection is uniform on both sides of the vehicle; it may rotate around the point of contact of the left wheel with the ground; and finally, it may rotate around the point of contact of the right wheel with the ground. In actual operation conditions, the exact position of the axle assembly 90 with respect to the vehicle frame 10 at any moment of time, is the result of the combination of said movements. If the right wheel of the vehicle meets an obstruction operating to raise said wheel, or if it follows a depression in the ground, the axle housing 90 will rotate through an arc around the point of contact of the left wheel with the ground. At the same time, this simple motion is modified and made more complicated by the movement of the axle in the vertical plane.

Means are provided in my novel spring suspension to provide for free movement of all of its parts and to insure free operation thereof in spite of the fact that some of said parts have to follow curved paths in the course of the above-described movements. By operation of the above means, said parts are permitted to move freely without any possibility of binding and, which is particularly important, they always remain in the intended operative engagement with respect to each other. For instance, the line contacts of gear and rack teeth have at all times uniform pressure along the entire line of contact and do not throw the entire pressure produced by the load on one side of said line. Considering the fact that the entire weight of the load and sprung parts of the vehicle is transmitted through the rack and gear teeth and through a multitude of hinged members, the above-described feature of my invention is particularly important.

It will be noted that the reactive force of the wedge-shaped member 80 tends to rotate the rocker arm 20 in a counter-clockwise direction around the pin 21 as a center, and the rocker arm 50 in a clockwise direction around the pin 51 as a center. Unrestricted by any other turning effort or moment acting in opposite direction, the turning moment produced by said reactive force of the member 80 would raise the gear portions 23 and 53 of the rocker arms 20 and 50 and would throw them out of engagement with the rack portions of the member 80. However, the turning effort produced by said member 80 is counterbalanced by the turning effort or moment produced by the reactions of the coil springs 31 and 41, 61 and 71. As the rocker arm 20 rotates around the pin 21 in a counter-clockwise direction, the spring 31 is compressed between the plate 32, the position of which in relation to the members 11 and 12 is fixed, and the cup 34 which is moving with the rocker arm 20. At the same time the spring 41 is compressed between the cup 44, the upward movement of which is prevented by the members 11 and 12, and the lower plate 42 which is movable with the aid of the bolt 43. It should be noted that the counter-action of both springs 31 and 41 is to exert a force to turn the rocker arm 20 in a clockwise direction. The springs, therefore, produce a reactive turning effort in the same direction.

Turning efforts are usually expressed in the art in terms of moments, that is, in terms of products of force applied to a body, by the distance along a perpendicular from the center of rotation of the body to the line passing through the point of application of the force and in the direction at which said force is acting, both values expressed in certain units. When moments tending to turn a body in a clockwise direction are equal to the moments tending to turn the same body in a counter-clockwise direction, the body is at rest, otherwise it will continue to turn in the direction of the greater moment until both moments are balanced. Applying the above to the present structure, it will be seen that the turning moment exerted upon the rocker arm 20 by the reaction of the wedge-shaped member 80 will turn said arm 20 in a counter-clockwise direction until the reaction of the springs 31 and 41 will produce a combined moment acting in the opposite direction but equal in its magnitude to the moment produced by the reaction of the wedge-shaped member 80.

Figure 8:
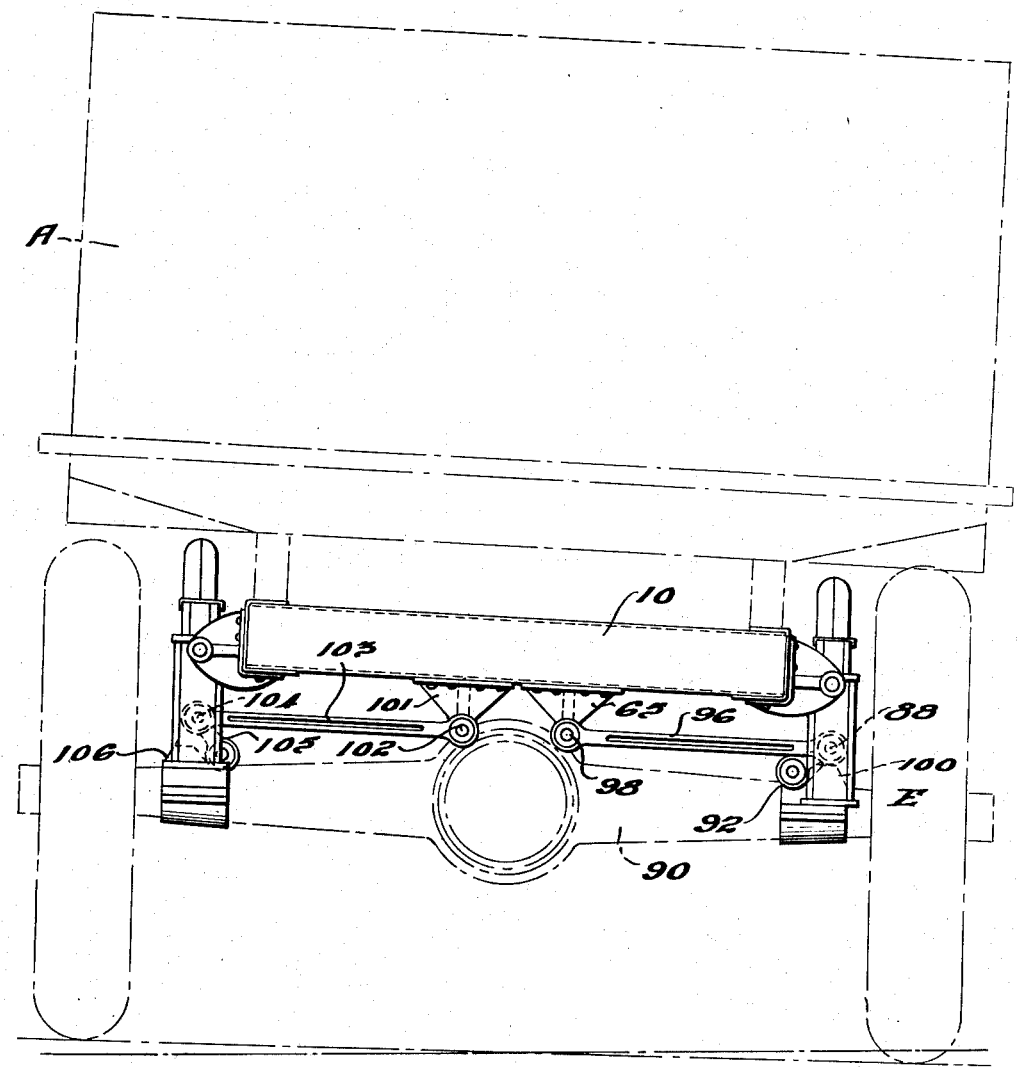
Fig. 8 is a rear view of a vehicle with a spring suspension embodying the present invention and showing the operation thereof on sharp curves.

It should be noted that the above description, referring to the spring suspension arranged at one side of the vehicle, is equally applicable to the other similar structure provided at the other side of the vehicle, such as shown in Fig. 8. It is to be understood that the spring suspension of my invention may be applied to more than one axle of the vehicle, and that the front axle of a vehicle may also be provided with my novel spring suspension. Thus, the combined weight of the load and sprung parts of the vehicle is transmitted to the ground through a spring construction in which the rate of the spring deflection varies in accordance with the magnitude of the combined weight.

It is commonly appreciated that since the deflection of a spring is proportional to the force acting upon it, the deflection of the springs in a vehicle is proportional to the load thereof. However, since the rate of spring deflection and the total resistance of vehicle springs is selected on the basis of maximum load which can be safely carried by the vehicle, the springs are usually too "stiff" for comfort or economical operation when the vehicle is only partially loaded. In the condition of partial load, the shocks of the road are more readily transmitted to the vehicle body, which makes riding uncomfortable or damages the products transported, and which in general contributes to noisy operation and premature destruction of vehicle bodies. On the other hand, it is impracticable to select vehicle springs on the basis of desired operation characteristics at light loads since it would require easily deflected springs, which will make the spring structure either entirely unsuitable for heavier loads or too cumbersome and unsafe at higher speeds.

The above difficulty is entirely eliminated in my novel spring suspension construction. It is an important feature of the present embodiment of the invention that the rate of the spring deflection is much greater at light loads than at heavier loads, and as the load of the vehicle increases the rate of the spring deflection decreases, producing the same effect as if the springs were actually becoming stiffer at increased loads.

It will be noted that as the wedge-shaped member 80 turns the rocker arm 20 in the counter-clockwise direction around the pin 21, the point of application of the force in the gear portion 23 moves to the lower part of said portion and, because of the curvature of the gear portion 23 having its center above the pin 21, toward said pin 21. Thus, as the load increases, the distance between the pin 21 and the point of application of the force decreases appreciably, proportionally decreasing the turning moment exerted by the member 80 on the rocker arm 20. In this condition the springs 31 and 41 are called upon for much lower resisting forces than would otherwise be required. This effect of the structure may be controlled by changing the curvature of the portions 23 and 53 or by moving the center of said curvature. The curvature may be so arranged that the decrease of said distance will be directly proportional to the increase of the reaction force, thus making the moment produced by said force substantially constant at all loads.

It is to be noted that cooperation of the wedge-shaped member 80 with the rocker arm 50 and the springs 60 and 70, is quite similar to the above-described operation of the rocker arm 20, and, therefore, separate description thereof is dispensed with.

Such operation insures a very "soft" action of the springs at light loads and proportionally "stiffer" action of the springs at higher loads, which results in a more economical and comfortable operation of the entire vehicle. Economy results from the fact that the tires, particularly those of the driving wheels, are always kept in contact with the ground and their acceleration during the periods of suspension in the air and resulting rubbing of the road surface at the moment of reestablishing the contact with the ground is eliminated, whereby excessive tire wear is prevented. Increased comfort is due to the fact that the springs readily absorb all shocks of the road even at very light loads. Thus, increased comfort is not effected with the aid of an excessive amount of springs of low deflection rate, as is the case with conventional designs.

An important function in operation of my novel spring suspension is performed by means permitting the vehicle to follow curves of usual radius on highways practically without decreasing its speed. It is common in highway construction to provide the so-called "super elevation" in the cross section of a highway at curves, that is, raising the outer portion of the cross section of the highway and lowering the inside portion thereof. Such construction will counteract the overturning moment produced by the centrifugal force resulting from curvature of the vehicle path. It has been proven that the beneficial effect of the super-elevation is greatly decreased by the conventional spring suspension constructions. Super-elevation of highways is computed as a compromise between a great number of conflicting requirements, resulting from the difference in the types of vehicles which range from slow moving heavy trucks to high speed low set passenger cars with relatively light sprung weight. As a result, in many cases super-elevation of a highway curve does not correspond to the requirements of some particular vehicle under particular conditions of speed, load distribution and spring deflection characteristics. Trucks are generally much more sensitive to such frequently occurring discrepancies between the actual and the required super-elevation, the same being due to the fact that trucks usually have a heavy sprung load which is very highly set, and an excessive super-elevation is just as dangerous for trucks as is an insufficient super-elevation. In many cases super-elevation is excessive for trucks, either throughout the entire length of a curve or at the beginning thereof.

Fig. 8 illustrates a vehicle in a condition of following a curve. It will be noticed that in this condition the center of gravity of the vehicle is displaced from the longitudinal vertical plane passing through the middle point of the line connecting the center of the wheels. In consequence thereof, with a spring suspension of the conventional design, the entire sprung portion of the vehicle, which is to say its load carrying structure, is somewhat moved toward the inside of the curve and therefore the springs on the inside of the curve will have a much greater deflection than the springs on the outside of the curve, thus preparing the vehicle to resist the action of the centrifugal force tending to produce an opposite effect. However, the uneven deflection of the springs is counter-balanced by the centrifugal force only when the load distribution in the vehicle, the weight of the vehicle, and the speed at which it travels correspond to the set of conditions for which the super-elevation and the radius of the road curve was originally computed. This condition seldom occurs in practice, and the springs are usually unevenly deflected when the vehicle is following a curve. In this condition of an uneven deflection of springs and particularly in the condition of excessively relieved deflection of the outer springs, should the centrifugal force suddenly increase (which may result from a multitude of causes), a load of considerable magnitude is suddenly applied to the outer springs. During the beginning of the deflection produced by said load and because of the relieved condition of the spring, the moving load is permitted to gain enough momentum to deflect the outer springs much further than they otherwise would be deflected if the same load would be applied gradually. Although after some oscillation the outside springs will come to a position corresponding to the static deflection under the above load, the inertia of the load may be great enough to produce a momentarily dangerous degree of deflection of the outside springs, which may cause overturning of the vehicle.

The instability of vehicles on curves due to this fact induces drivers to decrease the speed of fast moving vehicles as they approach a curve, often by a sudden application of brakes, which is uneconomical and often dangerous. In the present novel spring suspension the above difficulty is largely eliminated. From the examination of Fig. 8, it will be noticed that when the springs on the right hand side of the vehicle A are deflected more than those on the left hand side, the pin 88 goes down and in operating the torque arm 96 it pulls through the shackles 92 and 93 the corresponding shackles on the left hand side of the vehicle and turns said corresponding shackles to a sufficient angle to effect raising of the pin 104, together with the wedge-shaped member on the left hand side of the vehicle, high enough to increase the compression of the springs on that side of the vehicle. Thus, in my spring suspension the deflection of the springs is equalized and when following a curve the decrease in deflection of the outside springs will be immediately checked by the operation of the shackles and the torque arm. Thus, while in conventional designs the sudden increase of centrifugal force, throwing the load on the released springs, is a source of great danger, in my novel spring suspension such sudden increase of the centrifugal force is met by an increased spring load and does not result in a tendency to overturn the vehicle. It should be particularly noted that the action of the above means operates to transmit part of the compression, after acting on the inside springs, to the outside springs, thus causing the springs to resist the tendency of uneven deflection with an increased resisting force. By virtue of the above described construction a toggle linkage is provided on each end of the axle assembly 90, the torque arms being adapted to exert forces on the upper extremity of the shackles, effective to produce the desired toggle action of said linkage, thus compressing or relieving compression of the springs, as described.

Dangerous positions of the vehicle body are prevented by a suitable buffer 100 provided in proximity to the pin 88, as shown in Fig. 8, against which buffer the middle lug of the torque arm 96 rests when the body of the vehicle is tipped to a dangerous angle. Such a construction is illustrated in Fig. 8, wherein the right hand side of the vehicle is shown resting on said buffer 100. It should be further noted that when the vehicle body assumes the extreme position shown, the danger of overturning toward the left hand side of the vehicle is slight and it may be desirable to relieve some of the pressure acting upon the outside springs. This is effected automatically because of the fact that in this extreme position, further tilting of the vehicle body toward the right hand side thereof will operate to rotate the body in such a way as to push the pin 102 to the left and the pin 104 to the left and down, thus relieving the pressure on the raised side of the vehicle body. The above feature greatly adds to the stability of the vehicle and to the safety of its operation over bad or slippery roads.

It should also be noted that in this condition, the buffer 100 is not a substitute for the springs on the right hand side of the vehicle, since the springs continue to operate in spite of the fact that the middle lug of the torque arm 96 is resting against the buffer 100. A buffer 106 is provided on the left hand side of the vehicle and its operation is exactly the same as that of the buffer 100.

It will be appreciated that with the use of my novel spring suspension it is possible to operate power-driven land vehicles at much greater average speeds than has heretofore been possible, which effects considerable economy in time and in operation expenses.

Thus, in one of its broader aspects, my invention contemplates providing a novel spring suspension for land vehicles in which the rate of spring deflection increases with increase of the load, and furthermore in which deflection of the springs on both sides of the vehicle is equalized, in consequence whereof much greater speeds may be used on curves and much higher average speeds of transportation attained. My invention further contemplates providing means whereby forces producing an uneven deflection of the springs are resisted by said springs with increased forces, and providing means diminishing greatly the danger of overturning of the vehicle.

I claim:

1. A spring suspension for land vehicles comprising a wedge member mounted on the axle and extending upwardly therefrom, rocker arms carried by the frame of the vehicle and having opposed ends thereof contacting with the faces of said wedge member and movable in response to vertical movement of said wedge member, spring members secured to said rocker arms and yieldably resisting the movement imparted thereto by said wedge member, and a torque arm pivotally secured to the frame of the vehicle and having a pivoting shackle connection with the axle and said wedge member, whereby said wedge member may be moved in response to variations in loads imposed on said torque arm.

2. A spring suspension for land vehicles comprising a wedge member mounted on the axle and extending upwardly therefrom, rocker arms carried by the frame of the vehicle and having opposed ends thereof contacting with the faces of said wedge member and movable in response to vertical movement of said wedge member, compression coil spring members attached to said rocker arms and adapted to yieldably resist movement imparted thereto by said wedge member, and a torque arm pivotally secured to the frame of the vehicle and having a pivoting shackle connection with the axle and said wedge member, whereby said wedge member may be moved in response to variations in loads imposed on said torque arm.

3. A spring suspension for land vehicles comprising pivotal rocker members mounted on the frame of the vehicle and having compression coil spring members secured thereto and yieldably resisting pivotal movement thereof, a wedge member carried by the axle and having its apex extending between opposed ends of said rocker members and having its sides in intimate contact with the faces of said members, and means for moving said wedge to counteract varying load conditions on said springs and comprising a torque arm pivotally mounted on the vehicle frame and having a pivotal link connection with the axle and said wedge member, whereby movement of the torque arm causes said wedge member to displace said rocker members and compress said springs.

4. A spring suspension for land vehicles comprising rocker arms pivotally secured to a sub-frame mounted on the vehicle, compression spring members secured to said rocker arms on each side of the points of pivotal connection with the sub-frame and adapted to yieldably resist movements of said arms around said points, a wedge member carried by the axle and having its apex extending between opposed ends of said rocker members and having its sides in intimate contact with the faces of said members, and means for moving said wedge to counteract varying load conditions on said springs and comprising torque arms pivotally mounted on the vehicle frame and having pivotal link connections with the axle and said wedge member whereby movement of the torque arm causes said wedge member to displace said rocker members and compress said springs.

5. In a land vehicle, the combination of a frame; a sub-frame structure hinged to said frame and adapted to turn thereupon through an angle around an axis substantially parallel to the longitudinal axis of the vehicle; a wedge-shaped member hingedly connected to the axle housing of the vehicle, and adapted to be operatively engaged to exert a reactive force produced by the weight of the vehicle; two rocker arms hingedly connected to said sub-frame structure; and spring means connected to said sub-frame structure and said rocker arms and adapted to turn bodily therewith, said rocker arms being adapted to cooperate with said wedge-shaped member so as to cause the turning moment produced by the action of the wedge-shaped member to be substantially uniform at all loads.

6. In a land vehicle, the combination of a frame; two sub-frame structures hinged to said frame at the sides thereof; two members hingedly connected to the extremities of the axle housing of said vehicle and adapted to receive the pressure produced by the weight of the vehicle;

two rocker arms at each of said sub-frame structures, hingedly connected thereto and adapted to transmit the weight of the vehicle to said members; and spring means connected to said sub-frame structure and said rocker arms and adapted to turn bodily therewith around two respective axes of rotation thereof, whereby the uniformity of pressure at the engaging surfaces of said rocker arms and said members is substantially unaffected by the position of the vehicle axle.

7. In a land vehicle, the combination of a frame; two sub-frame structures hinged at said frame and adapted to rotate through an angle around a line substantially parallel to the longitudinal axis of the vehicle; two wedge-shaped members connected to the extremities of the vehicle axle at their bases and having rack portions at their converging sides; two rocker arms at each of said sub-frame structures, hingedly attached thereto by transverse hinges permitting their rotation around said pins in vertical planes substantially parallel to the longitudinal axis of the vehicle, said rocker arms provided with gear portions adapted to engage the rack portions of said wedge-shaped member, the centers of curvature of said gear portion being above the centers of the rocker-arm pins, whereby the distance between a pin and the point of contact of a respective rocker arm with the respective wedge-shaped member increases inversely proportional to the load of the vehicle; a number of springs connected to said sub-frame structure and said rocker arms and adapted to follow bodily the rotative movements of both the sub-frame structure and the rocker arms around their respective axes of rotation, said springs cooperating with said rocker arms and adapted to balance the turning moments exerted upon said rocker arms by the reactive forces of said wedge-shaped members.

8. In a spring suspension for a land vehicle having a frame and an axle, a toggle linkage at each side of the vehicle, said linkage including torque arms hingedly secured to the vehicle frame, shackles pivotally secured to the vehicle axle at the extremities thereof and hingedly connected to said torque arms, and resilient means supported by said shackles and supporting said frame, whereby tilting of the frame to one side of the vehicle produces compression of the resilient frame supporting means on the other side of the vehicle.

9. In a spring suspension for a land vehicle having a frame and an axle, a toggle linkage at each side of the vehicle, said linkage including torque arms hingedly secured to the vehicle frame, shackles pivotally secured to the vehicle axle at the extremities thereof and hingedly connected to said torque arms, and springs supported by said shackles and carrying the vehicle frame, said toggle linkage adapted, as the vehicle tilts to one side, to load the spring on the opposite side thereof.

10. In a spring suspension for a land vehicle having a wheel carrying axle and a load carrying sprung frame, a toggle linkage on each side of the vehicle, said linkage including a shackle pivotally secured by its lower extremity to said axle and extending upwardly and outwardly therefrom, a spring supported by the upper extremity of said shackle and in turn supporting the load carrying frame, and an arm hingedly connected by its respective extremities to said frame and to the upper extremity of said shackle and adapted to exert a force on said upper extremity of the shackle, said force being effective to load said spring as the vehicle tilts to the side opposite to the side on which said respective linkage and spring are arranged.

11. In a spring suspension for a land vehicle having a wheel carrying axle and a load carrying sprung frame, a toggle linkage on each side of the vehicle, said linkage including a shackle pivotally secured by its lower extremity to said axle and extending upwardly and outwardly therefrom, a compression spring supported by the upper extremity of said shackle, and an arm hingedly connected by its respective extremities to the frame and to the upper extremity of said shackle and adapted to exert a pulling force on said upper extremity of the shackle, said force being effective to compress said spring as the same is relieved of its compression by tilting of the vehicle to the opposite side.

12. In a spring suspension for a land vehicle having a wheel carrying axle and a load carrying sprung frame, a toggle linkage on each side of the vehicle, said linkage including a shackle pivotally secured by its lower extremity to the respective end of said axle and extending upwardly and outwardly therefrom, a compression spring supported by the upper extremity of said shackle, and an arm hingedly connected by its respective extremities to the frame and to the upper extremity of said shackle and adapted to exert a pulling force on said upper extremity of the shackle, said force being effective to compress said spring as the same is relieved of its compression by tilting of the vehicle to the opposite side, and to press the end of the axle downward.

13. In a spring suspension for a land vehicle having a wheel carrying axle and a load carrying sprung frame, a toggle linkage on each side of the vehicle, said linkage including a shackle pivotally secured by its lower extremity to the respective end of said axle and extending upwardly and outwardly therefrom, a compression spring supported by the upper extremity of said shackle, and an arm hingedly connected by its respective extremities to said frame and to the upper extremity of said shackle and adapted to exert a pulling force on said upper extremity of the shackle, said force being effective to compress said spring as the same is relieved of its compression by tilting of the vehicle to the opposite side, and to press the end of the axle downward, said arm being further adapted to exert a pushing force on the upper extremity of the shackle, effective to move the same downward, thereby relieving compression of said spring when the same is compressed because of tilting of the vehicle toward it.

14. In a spring suspension for a land vehicle having a wheel carrying axle and a load carrying sprung frame, a toggle linkage on each side of the vehicle, said linkage including a shackle pivotally secured by its lower extremity to the respective end of said axle and extending upwardly and outwardly therefrom, a compression spring supported by the upper extremity of said shackle, an arm hingedly connected by its respective extremities to said frame and to the upper extremity of said shackle and adapted to exert a pulling force on said upper extremity of the shackle, said force being effective to compress said spring as the same is relieved of its compression by tilting of the vehicle to the opposite side, to press the end of the axle downward, said arm being further adapted to exert a pushing force on the upper extremity of the shackle, effective to move the same downward, thereby relieving compression of said spring when the same is compressed because of tilting of the vehicle toward it, and means limiting the downward movement of the upper extremity of said shackle.

15. In a spring suspension for a land vehicle having a wheel carrying axle and a load carrying sprung frame, a toggle linkage on each side of the vehicle, said linkage including a shackle pivotally secured by its lower extremity to the respective end of said axle and extending upwardly and outwardly therefrom, a compression spring supported by the upper extremity of said shackle, an arm hingedly connected by its respective extremities to said frame and to the upper extremity of said shackle and adapted to exert a pulling force on said upper extremity of the shackle, said force being effective to compress said spring, as the same is relieved of its compression by tilting of the vehicle to the opposite side, and to press the end of the axle downward, said arm being further adapted to exert a pushing force on the upper extremity of the shackle effective to move the same downward thereby relieving compression of said spring when the same is compressed because of tilting of the vehicle toward it, and a buffer on said axle limiting the downward movement of the upper extremity of said shackle and consequently preventing dangerous tilting of said frame.

SVEN INGILDSEN.